R. J. LAWRENCE.
SAW FRAME.
APPLICATION FILED OCT. 26, 1912.
1,060,770.
Patented May 6, 1913.
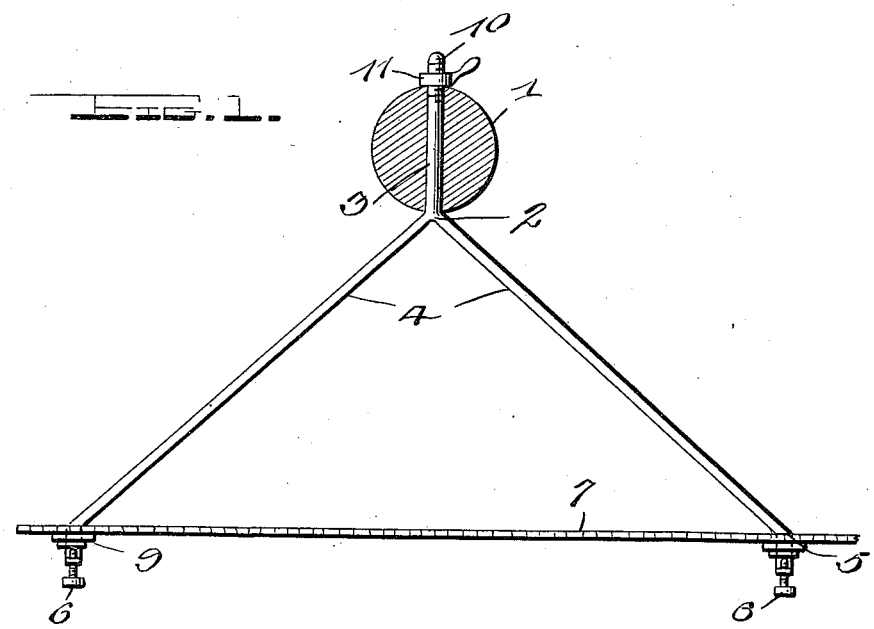
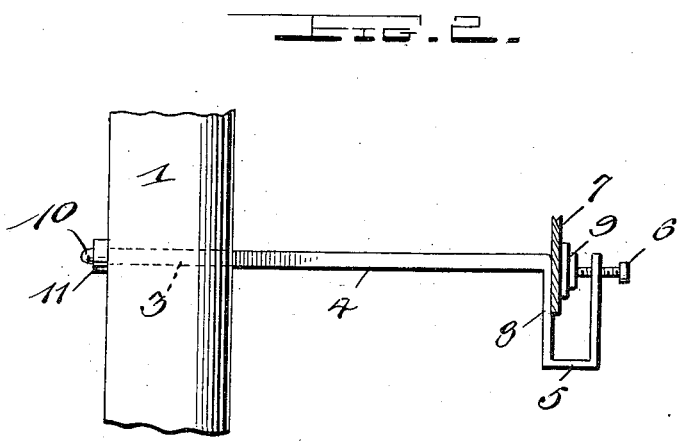

UNITED STATES PATENT OFFICE.

ROBERT J. LAWRENCE, OF PANOLA COUNTY, TEXAS.

SAW-FRAME.

1,060,770. Specification of Letters Patent. Patented May 6, 1913.

Application filed October 26, 1912. Serial No. 727,984.

*To all whom it may concern:*

Be it known that I, ROBERT J. LAWRENCE, a citizen of the United States, residing in Panola county, Texas, near Logansport, in the parish of De Soto and State of Louisiana, have invented certain new and useful Improvements in Saw-Frames, of which the following is a specification, reference being had to the accompanying drawings.

This invention relates to improvements in saw frames for supporting saws when the teeth are to be sharpened or set, and an object of the invention is the provision of a device of this character, in which a drag saw may be supported, or two ordinary hand saws may be supported at the same time.

A further object of this invention is the provision of a saw frame which may be removably secured in a stationary support and which may be easily carried from one place to another.

With these and other objects in view, my invention resides in the simple construction and arrangement of parts to be hereinafter more fully described, claimed and illustrated in the accompanying drawings, in which—

Figure 1 is a top plan view of the saw frame showing it attached to a stationary support and Fig. 2 is a side elevation thereof.

Referring to the drawing by characters, the reference numeral 1 designates a stationary support which may be a post, fence, or any other desirable object and the numeral 2 designates generally my improved saw frame. The saw frame comprises a shank 3 which is provided on one end with a pair of laterally diverging arms 4, the outer ends of which arms, are bent to form substantially U-shaped brackets 5 in which the saw may be secured by the set screws 6 or any other suitable clamping means. The saw 7 is positioned between the inner arms 8 of the brackets and suitable clamp boards 9, whereupon the clamping devices 6 are tightened against clamp boards 9 whereupon the saw will be held securely in position in the frame.

It will be apparent from the drawing that if desired, a hand saw may be secured in each of the brackets, allowing a separate operator to work upon each of the saws, and in this way a minimum number of frames are necessary. If desired, the opposite end of the shank 3 of the frame may be threaded as at 10 for the reception of a nut 11 whereby the frame may be detachably secured to the stationary support.

From the above description taken in connection with the accompanying drawings, it will be seen that my improved saw frame is formed of one piece of material, and it is therefore simple in construction and may be cheaply manufactured and also is a frame such as will fulfil all the requirements of such a device.

Having thus fully described my invention, what I desire to claim and secure by Letters Patent is:—

1. In combination with a vertical support, a shank extending transversely through said support, forwardly extending oppositely diverging arms formed on one end of said shank, brackets formed on said arms at their outer ends, clamping means mounted in said brackets, and means for securing said shank to said support, as and for the purpose described.

2. In combination with a vertical support, a shank extending transversely through said support, forwardly extending oppositely diverging arms formed on one end of said shank, said arms being formed with substantial U-shaped brackets at their outer ends, clamping screws disposed through one arm of said brackets, and means formed on the opposite end of said shank whereby said shank may be secured to said support, as and for the purpose described.

3. A device of the character described, comprising a shank, integral laterally diverging arms formed on one end of said shank, brackets formed integrally with said arms at the outer ends thereof, clamping means mounted in said brackets, and the opposite end of said shank being threaded for a portion of its length, whereby the device may be secured to a suitable support.

In testimony whereof I hereunto affix my signature in the presence of two witnesses.

ROBERT J. LAWRENCE.

Witnesses:
   J. N. RAMSEY,
   LUTHER JAY.

Copies of this patent may be obtained for five cents each, by addressing the "Commissioner of Patents, Washington, D. C."